(12) United States Patent  
Triantafillos et al.

(10) Patent No.: US 8,458,137 B2  
(45) Date of Patent: Jun. 4, 2013

(54) BACKUP AND RETENTION MONITORING

(75) Inventors: Anastasios Triantafillos, Addison, IL (US); Ankur Kumar, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 13/031,699

(22) Filed: Feb. 22, 2011

(65) Prior Publication Data

US 2012/0215743 A1 Aug. 23, 2012

(51) Int. Cl.  
*G06F 7/00* (2006.01)  
*G06F 17/00* (2006.01)

(52) U.S. Cl.  
USPC .......................................................... 707/654

(58) Field of Classification Search  
None  
See application file for complete search history.

(56) References Cited

U.S. PATENT DOCUMENTS

| | | | |
|---|---|---|---|
| 7,047,386 B1* | 5/2006 | Ngai et al. ..................... | 711/170 |
| 2008/0034003 A1* | 2/2008 | Stakutis et al. ............... | 707/200 |
| 2009/0013008 A1* | 1/2009 | Asano et al. .................. | 707/202 |
| 2009/0150542 A1* | 6/2009 | Yahiro et al. .................. | 709/224 |
| 2009/0172319 A1* | 7/2009 | Gokhale et al. ............... | 711/159 |
| 2009/0248954 A1* | 10/2009 | Hiraiwa et al. ............... | 711/100 |

* cited by examiner

*Primary Examiner* — Cheryl Lewis  
*Assistant Examiner* — Raheem Hoffler  
(74) *Attorney, Agent, or Firm* — Banner & Witcoff, Ltd; Michael A. Springs

(57) ABSTRACT

A system and method of monitoring retention of backups made of various systems, servers, files, and the like is provided. The system and method may include receiving retention data at a retention monitoring system. The retention data may include an actual retention period for one or more systems, servers, files, and the like, and may further include determining whether the actual retention period matches a predefined retention period. If so, the data may be formatted, compiled, and displayed. If the actual retention period does not match the predefined retention period, the retention data may be identified as non-standard and then may be formatted, compiled, and/or displayed. Additional aspects of the system and method may include receiving an actual amount of storage capacity used by the backups of the systems, servers, files, and the like. If the actual amount of storage capacity does not match an allotted amount of capacity, the data may be identified as non-standard.

17 Claims, 6 Drawing Sheets

BACKUP AND RETENTION MONITORING

BACKGROUND

Security and preservation of data of computer networks, systems, servers, and the like is a top priority for most companies, government agencies, universities, and the like. Accordingly, entities such as these generally have backup systems that backup various networks, servers, files, and the like that may be needed to recreate or restore the system in the event of a catastrophic failure. These backups may be maintained for a predefined period of time or retention period. This retention period may be defined based on various factors such as frequency of backups, likelihood of failure, and the like, as well as amount of storage space available to maintain the backups. Accordingly, if the retention period is altered, the amount of storage capacity needed to retain those backups may increase. Accordingly, it would be advantageous to provide a system to monitor the actual retention periods and actual capacity used by the backups against the predefined retention period and capacity allotted in order to identify systems using excessive capacity.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of monitoring retention of backups made of various systems, servers, files, and the like is provided. The system and method may include receiving retention data at a retention monitoring system. The retention data may include an actual retention period for one or more systems, servers, files, and the like. The system and method may further include determining whether the actual retention period matches a predefined retention period. If so, the data may be formatted and compiled, as desired, and displayed. If the actual retention period does not match the predefined retention period, the retention data may be identified as non-standard and then may be formatted, compiled, and/or displayed.

Additional aspects of the system and method may include receiving an actual amount of storage capacity used by the backups of the systems, servers, files, and the like. If the actual amount of storage capacity does not match an allotted amount of capacity, the data may be identified as non-standard.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
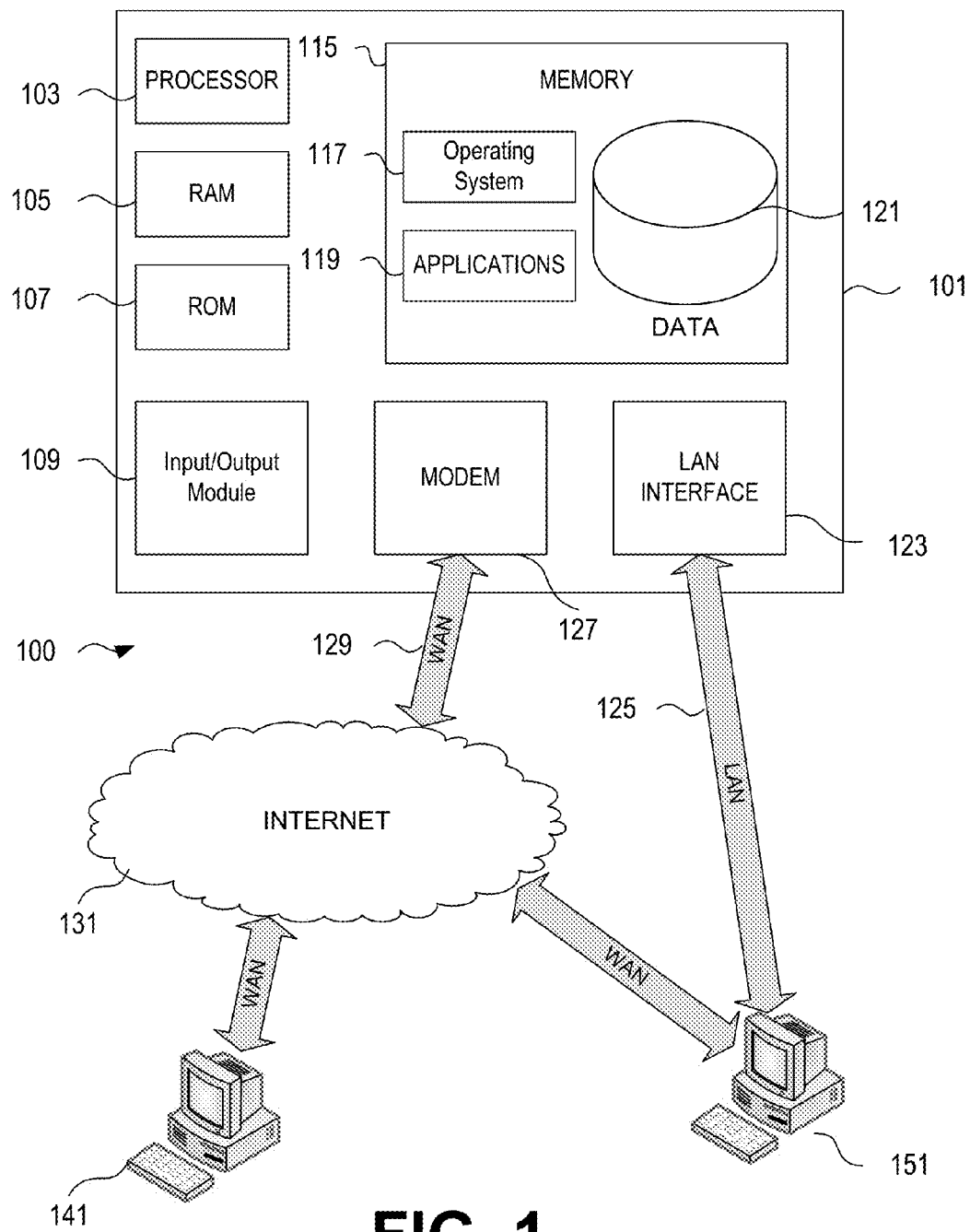
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions, as well as government organizations, universities, and other organizations having backup systems for one or more networks, servers, systems, and the like, and retention policies for maintaining those backups. For instance, any entity having a backup system for one or more systems, networks, and the like may have a predefined number of hours, days, weeks, and the like that those backups are maintained. This retention period is often considered a retention policy and applies to various systems. Further, the retention policy may be crafted in order to provide protection should a system need to be rebuilt, while avoiding consuming excessive amounts of storage space. For instance, a retention policy may indicate that backed up files may be deleted or overwritten in 2, 7 or 14 days. Accordingly, the storage needed to maintain the backups is greatly reduced from what would be needed if the backups were maintained for 30 or 60 days, or even indefinitely. Retention policies may also include other types of triggers or conditions for retaining the backups. For example, a retention policy may indicate that certain types of backups should be maintained until a specified condition is satisfied, e.g., upon a subsequent backup being made for the same system.

However, retention policies including periods and conditions are often altered and some backups may be maintained for longer than the desired period. For instance, a retention period of 7 days may be changed to 14 or 30 days which would require additional backup storage space to accommodate this longer period. Various retention systems would benefit from a single user interface providing information about the systems backed up and the retention policies associated with those systems. As will be discussed more fully below, retention information may be compiled and formatted in a user-friendly manner in order to provide an overall picture of the status of the retention policies, what customers, departments, entities, systems, and the like have longer retention periods than recommended, the amount of storage being used, and so on.

Figure 2:
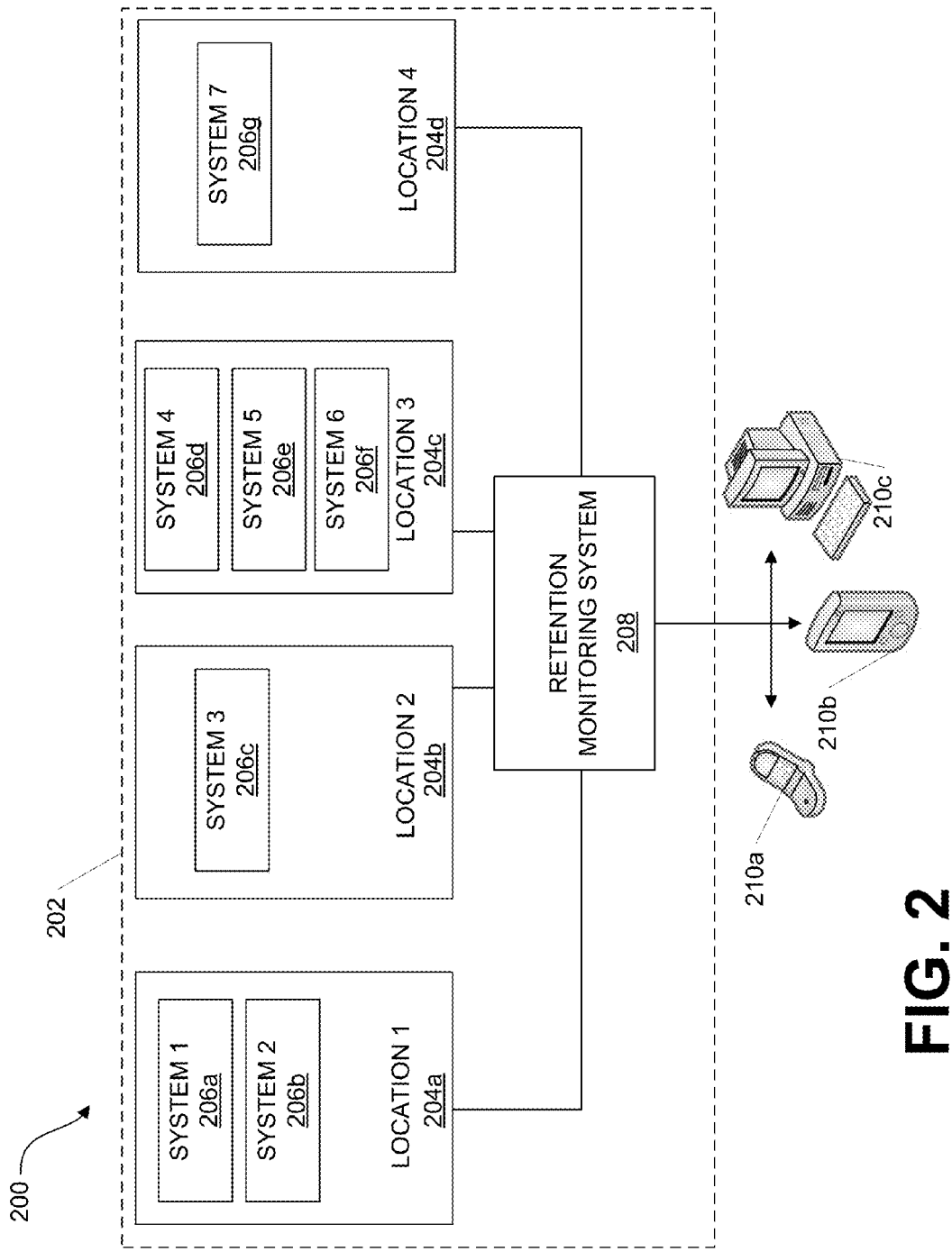
FIG. 2 illustrates an example system for monitoring and displaying retention data according to one or more aspects described herein.

FIG. 2 illustrates one example system for receiving retention data and displaying the received data. The system 200 may be contained within an entity 202 implementing the data retention monitoring system. For instance, if the system 200 is monitoring data retention at various systems within a company, such as a financial institution, the system 200 may be contained within the company (e.g., 202). Additionally or alternatively, the system 200 may monitor one or more systems internal to the entity 202 and/or external to the entity 202. For instance, although each of systems 1-7 206a-206g are shown in FIG. 2 as being within the entity 202, some or all of the systems 1-7 206a-206g may be external to the entity 202.

Systems 206a-206g may include backups made and/or retention policies for one or more files, systems, servers, and the like within systems 206a-206g. In some examples, the systems 206a-206g may be arranged at various locations, such as different geographic locations. That is, a company may have offices in one city on the east coast and another city on the west coast. The systems supporting those offices may be backed up and those backups and/or retention policies may be received by and monitored at system 200, and, in particular, at retention monitoring system 208, as will be discussed below.

The systems 206a-206g at various locations 204a-204d may be connected to the retention monitoring system 208 via a network (e.g., Internet, intranet, and so on). In some examples, retention monitoring system 208 may be in the same geographic location as one or more of locations 204a-204d and systems 206a-206g. Alternatively, retention monitoring system 208 may be in a geographic location different from any of locations 204a-204d having systems 206a-206g. As mentioned above, retention monitoring system 208 may receive backup and/or retention data from the systems 206a-206g in various locations 204a-204d. In some arrangements, the retention data may include current retention period, desired or predefined retention period, clients associated with various backups (files, systems, servers, and the like), amount of storage used, and so on.

The received retention data may, in some arrangements, be compiled by the retention monitoring system 208. Additionally or alternatively, the received retention data may be formatted by the retention monitoring system 208 in order to provide a user interface that may be accessed by various users to monitor the overall status of retention throughout the system 200, entity 202, and so on. The user interface may be accessed via various user devices, such as a cell phone or smart phone 210a, personal digital assistant 210b and/or computer 210c. The user devices 210a-210c may connect to the retention monitoring system 208 via one or more networks using known methods of connection, network protocols, hardware, software, and so on.

In some arrangements, a user may access the retention monitoring system 208 to access received retention data. One or more user interfaces (not shown) may be displayed at the retention monitoring system 208 to permit a user to configure the data, view status of the data, identify systems having incorrect retention policies or levels, identify clients or systems using excessive backup space, and the like. User interaction with the retention monitoring system 208 will be discussed more fully below.

Figure 3:
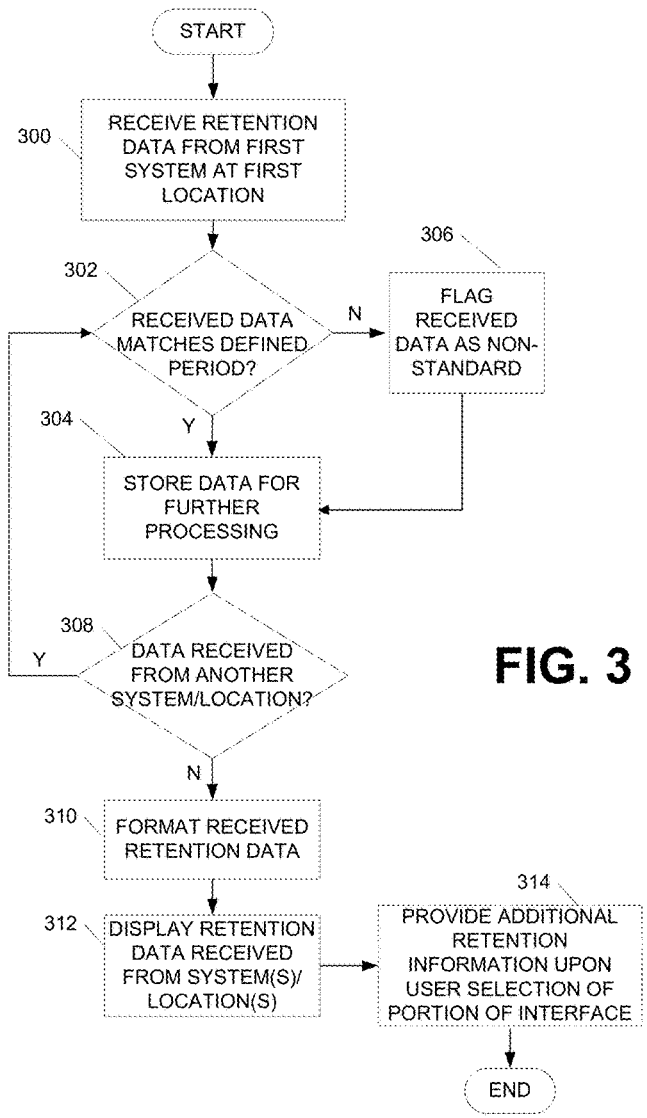
FIG. 3 illustrates one example method of receiving and monitoring retention data according to one or more aspects described herein.

FIG. 3 illustrates one example method of receiving retention data and monitoring and/or displaying that retention data. In step 300, retention data from a first system at a first location is received, such as by the retention monitoring system 208 in FIG. 2. As discussed above, retention data may include actual retention period, defined retention period, server or system name or identifier, client associated with the server or system identifier, amount of storage used, and so on. In step 302, a determination is made as to whether the received retention data matches predefined criteria. For instance, the determination in step 302 may include determining whether the actual retention period matches the defined retention range or period for that system, server, and so on. That is, a company or entity may define desired retention levels, periods, and so on that may provide protection in case a system may need to be rebuilt, while optimizing the amount of storage space used (e.g., not retaining files for longer than necessary due to additional storage needed, and so on). In some arrangements, the retention policies (e.g., periods, conditions) may be specific to the system that is to be backed up. In one example, a company may determine that backups may be retained for 2 days, 7 days or 14 days, depending on the type of system, server, files, and so on. If, in step 302, the actual retention period does not match the predefined retention period for that system, server, file, and so on, that retention data may be flagged as non-standard in step 306 and stored for further processing in step 304.

If the received retention data does match the predefined retention period, that data is then stored for further processing in step 304. In step 308, a determination is made as to whether retention data has been received from additional systems, locations, and so on. If so, the process may return to step 302 to determine whether the received data matches the predefined criteria. If no additional data has been received in step 308, the received data may be compiled and/or formatted in step 310. For instance, all non-standard retention periods (i.e., retention data having actual retention periods not matching the predefined retention period) may be identified and displayed together as non-standard items, while all standard retention periods (i.e., those whose actual retention periods match the predefined retention period) may be grouped together for display and analysis purposes.

In some examples, the data may also be formatted to provide ease of display and understanding for a user. For instance, the data may be formatted to be displayed graphically, or may be formatted to present to the user in a more understandable manner.

Figure 4:
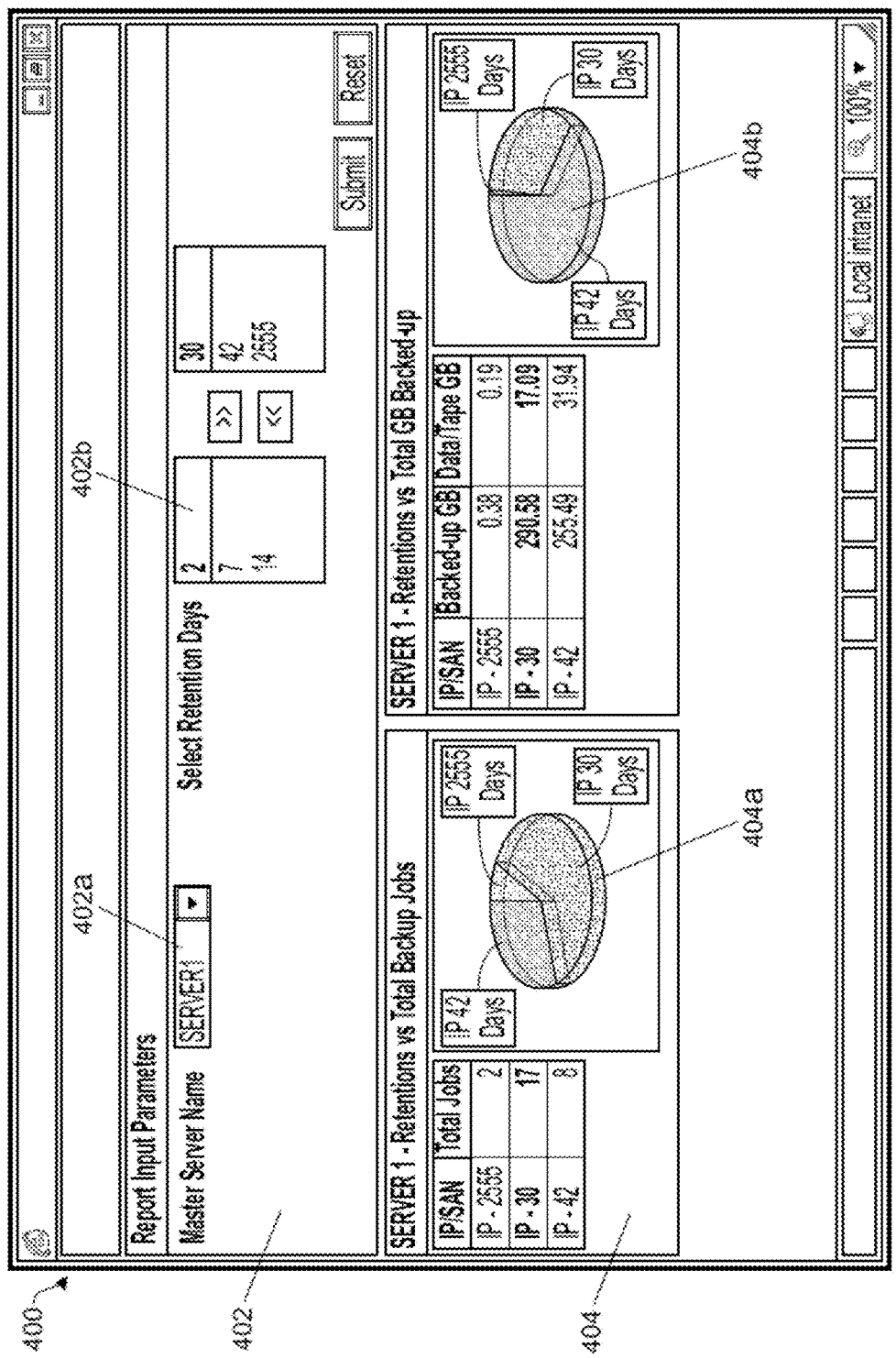
FIG. 4 illustrates one example user interface for displaying and monitoring retention data according to one or more aspects described herein.

In step 312, the formatted and/or compiled data may be displayed, such as by the retention monitoring system. Display of the data may, in some examples, include a graphical representation of the data. For example, FIG. 4 includes one example graphical representation of the data. In FIG. 4, the display 400 includes input parameters section 402. Section 402 may permit a user to identify one or more servers, systems, and the like to view. The user may select a system by server name in field 402a or by retention period in field 402b. In some examples, searching by retention period in field 402b may include searching by predefined retention period. For example, if a user selects 7 days as the retention period to view, all backups having a predefined retention period (e.g., retention policy) of 7 days may be displayed, including those having an actual retention period other than 7 days.

Display 400 may further include one or more graphical representations of the data. For instance, in field 404, two pie charts are shown. Chart 404a illustrates retentions vs. total backup jobs, while chart 404b illustrates retentions vs. total gigabytes backed up. In some arrangements, portions of the graph may be color coded to identify excessive retention periods, excessive storage space being used, and so on. Although these two examples of graphical representation of the data are shown, various other types of representations (charts such as bar graphs, line graphs, and the like), as well as data illustrated graphically (e.g., number of retentions not matching predefined retention period, and so on) may be provided without departing from the invention.

Display of the retention data graphically may aid a user in identifying potential issues. For example, once the data is compiled, a user may be able to view how many retentions are non-standard as compared to how many are standard (i.e., amount of chart consumed by non-standard retentions vs. stand retentions). This may aid in determining what systems are using additional storage capacity and may aid in identifying servers, systems, and so on in which the retention period no longer matches the predefined period and should be revised.

Figure 5:
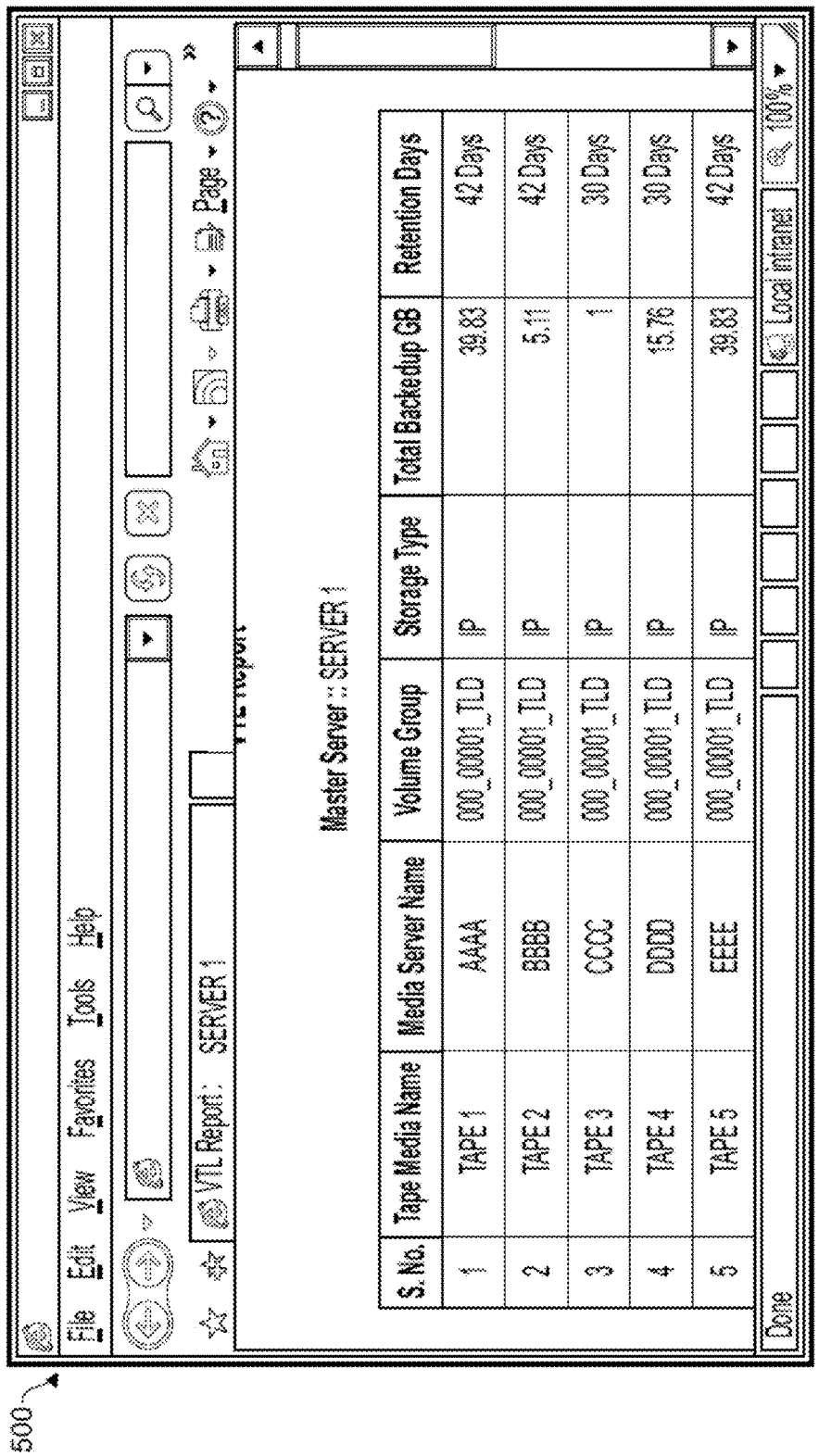
FIG. 5 illustrates another example user interface for displaying and monitoring retention data according to one or more aspects described herein.

With further reference to FIG. 3, once the data has been displayed in step 312, additional retention data may be displayed upon selection of a portion of the display in option step 314. For example, selection of a graphical display of the data (such as pie chart 404a, 404b in FIG. 4) may prompt additional information about the retention data associated with that chart or graph. For instance, selection of graph 404a may prompt a retention information window, such as window 500 in FIG. 5. The retention information window may include information such as predefined retention period, actual retention period, amount of space used for retention, specific files retained and the associated predefined and actual retention periods, and so on. In some examples, the data presented in the retention information window may be customizable by a user to include information desired by the user. Additionally or alternatively, the appearance of the retention information window may be customizable in order to enable users to present data in a manner helpful to them. Additionally or alternatively, selection of a slice or portion of graph 404a or 404b may also cause additional data and information to be displayed.

Figure 6:
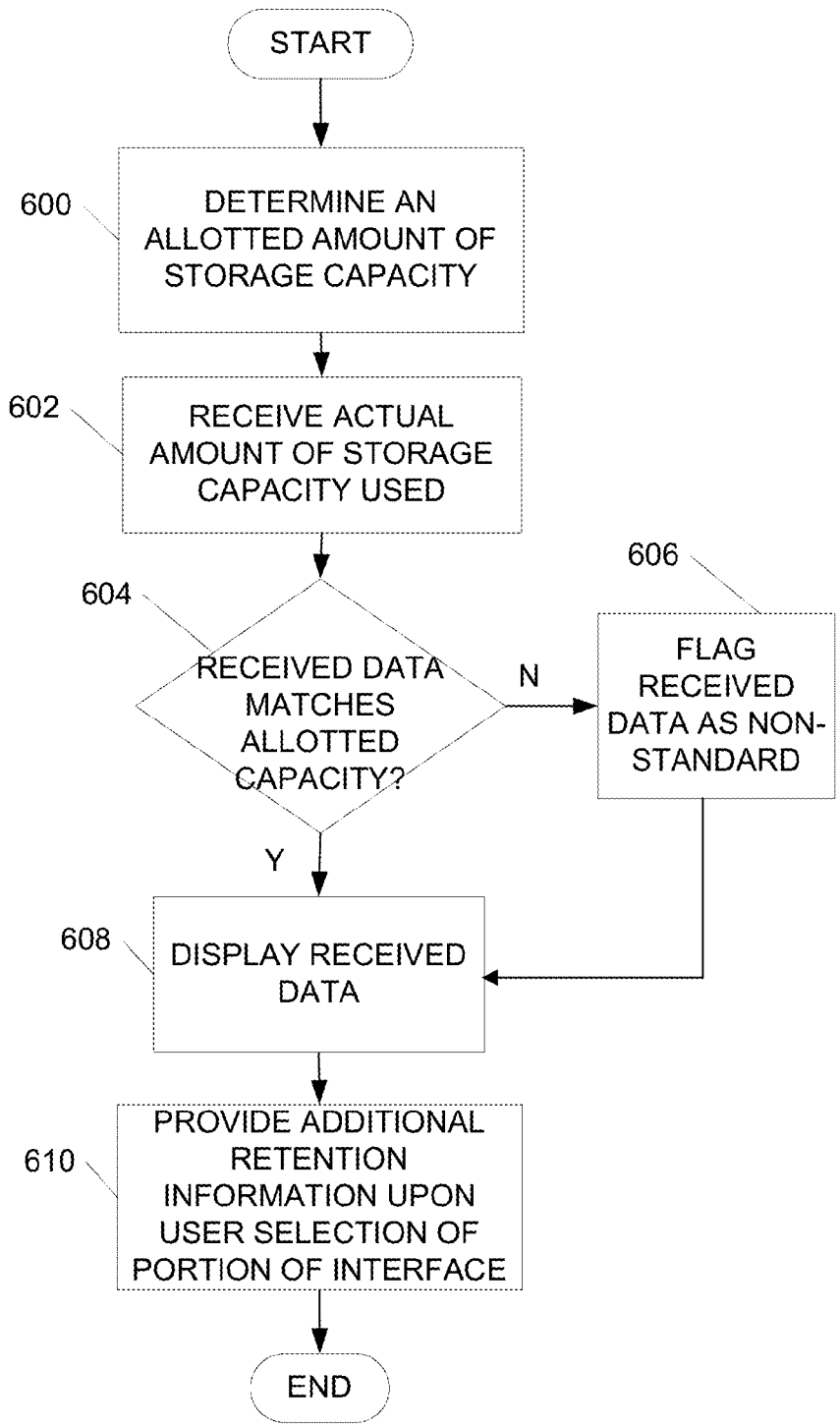
FIG. 6 illustrates another example method of monitoring retention data according to one or more aspects described herein.

FIG. 6 illustrates another example aspect of the retention monitoring system that may be used to identify system, servers, files, and so on exceeding an allotted amount of storage capacity. In step 600, an allotted amount of storage capacity is identified. The allotted amount of capacity may be determined based on a predefined retention period for the system, server, files, and so on. In step 602, an actual amount of storage capacity used is received. In step 604, a determination is made as to whether the actual amount of storage capacity used matches the allotted amount of storage capacity. If not, the received capacity data is identified as non-standard in step 606. If the allotted amount of storage capacity does match the actual amount of storage capacity used, or once the capacity as been identified as non-standard, the received data may be displayed in step 608. In step 610, additional retention information may be provided upon selection of at least a portion of the displayed data. For example, a user may select a portion of the display (e.g., a pie chart as discussed above) and an additional retention information window may be displayed including the allotted amount of storage capacity, system identifier, and the like.

The retention monitoring system described herein may aid in evaluating available storage capacity and identifying servers, systems, files, and so on exceeding a desired amount of storage capacity. This excessive storage may be the result of incorrect retention periods and the retention monitoring system may aid in identifying those systems having incorrect or non-standard retention periods. Further, in some examples, identification of a system, server, file, and the like exceeding the predefined retention period or a predefined storage capacity may result in an automatic notification of this irregularity being transmitted to the system or system administrator.

The retention monitoring system described herein may be used with various types of backup and retention systems. For instance, in some examples, the retention monitoring system may be used with a virtual tape library backup and retention system. However, the retention monitoring system may be used with other backup and retention systems without departing from the invention.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
    receiving, by a retention monitoring system, first retention data from a first system at a first location;
    determining, by the retention monitoring system, whether the received first retention data matches first predetermined criteria;
    receiving, by the retention monitoring system, second retention data from a second system at a second location;
    determining, by the retention monitoring system, whether the second retention data matches second predetermined criteria;
    displaying, by the retention monitoring system, the first retention data and the second retention data;
    determining, by the retention monitoring system, that one or more of the first retention data and the second retention data exceeds a predefined amount of storage capacity associated with the first retention data and the second retention data;
    displaying, by the retention monitoring system, data exceeding the predefined amount of storage capacity;
    determining, by the retention monitoring system, whether additional retention data has been received;
    responsive to determining that additional retention data has been received, determining, by the retention monitoring system, whether the additional retention data matches an additional predefined criteria;
    responsive to determining that the additional retention data does not match the predefined criteria, flagging the first retention data; and
    displaying the additional retention data with the first retention data and the second retention data.

2. The method of claim 1, wherein the first retention data and the second retention data are compiled prior to being displayed.

3. The method of claim 1, wherein the first location and the second location are different geographic locations.

4. The method of claim 1, wherein the first predetermined criteria and the second predetermined criteria are a retention period.

5. The method of claim 1, further including:
    responsive to determining that the first retention data does not match the predetermined criteria, identifying the first retention data as non-standard; and
    responsive to determining that the first retention data does match the predetermined criteria, identifying the first retention data as standard.

6. The method of claim 1, further including, prior to displaying the first retention data and the second retention data, formatting received retention data.

7. The method of claim 1, further including:
    receiving user selection of a portion of the displayed first retention data and second retention data; and
    responsive to receiving the user selection, displaying a retention information window including at least one of: system identifier, predefined retention period, backup retention period, and amount of storage capacity used.

8. One or more non-transitory computer readable media storing computer readable instructions that, when executed, cause an apparatus to:
    receive, by a retention monitoring system, first retention data from a first system at a first location;
    determine, by the retention monitoring system, whether the received first retention data matches first predetermined criteria;
    receive, by the retention monitoring system, second retention data from a second system at a second location;
    determine, by the retention monitoring system, whether the second retention data matches second predetermined criteria;
    display, by the retention monitoring system, the first retention data and the second retention data;
    determine that one or more of the first retention data and the second retention data exceeds a predefined amount of storage capacity associated with the first retention data and the second retention data;
    display data exceeding the predefined amount of storage capacity;
    determine, by the retention monitoring system, whether additional retention data has been received;
    responsive to determining that additional retention data has been received, determine, by the retention monitoring system, whether the additional retention data matches an additional predefined criteria;
    responsive to determining that the additional retention data does not match the additional predefined criteria, identify the first retention data as non-standard; and
    display the additional retention data with the first retention data and the second retention data.

9. The one or more non-transitory computer readable media of claim 8, wherein the instructions, when executed, further cause the apparatus to compile the first retention data and the second retention data prior to being displayed.

10. The one or more non-transitory computer readable media of claim 8, wherein the first predetermined criteria and the second predetermined criteria are a retention period.

11. The one or more non-transitory computer readable media of claim 8, wherein the instructions, when executed, further cause the apparatus to:
    responsive to determining that the first retention data does not match the predetermined criteria, identify the first retention data as non-standard; and
    responsive to determining that the first retention data does match the predetermined criteria, identify the first retention data as standard.

12. The one or more non-transitory computer readable media of claim 8, wherein the instructions, when executed, further cause the apparatus to:
    receive user selection of a portion of the displayed first retention data and second retention data; and responsive to receiving the user selection, display a retention information window including at least one of: system identifier, predefined retention period, backup retention period, and amount of storage capacity used.

13. An apparatus comprising:

at least one processor; and memory operatively coupled to the processor and storing computer readable instructions that, when executed, cause the apparatus to:
- receive, by a retention monitoring system, first retention data from a first system at a first location;
- determine, by the retention monitoring system, whether the received first retention data matches first predetermined criteria;
- receive, by the retention monitoring system, second retention data from a second system at a second location;
- determine, by the retention monitoring system, whether the second retention data matches second predetermined criteria;
- display, by the retention monitoring system, the first retention data and the second retention data;
- determine that one or more of the first retention data and the second retention data exceeds a predefined amount of storage capacity associated with the first retention data and the second retention data;
- display data exceeding the predefined amount of storage capacity;
- determine, by the retention monitoring system, whether additional retention data has been received;
- responsive to determining that additional retention data has been received, determine, by the retention monitoring system, whether the additional retention data matches an additional predefined criteria;
- responsive to determining that the additional retention data does not match the additional predefined criteria, identify the first retention data as non-standard; and
- display the additional retention data with the first retention data and the second retention data.

14. The apparatus of claim 13, wherein the computer-readable instructions, when executed, further cause the apparatus to compile the first retention data and the second retention data prior to being displayed.

15. The apparatus of claim 13, wherein the first predetermined criteria and the second predetermined criteria are a retention period.

16. The apparatus of claim 13, wherein the computer-readable instructions, when executed, further cause the apparatus to:
- responsive to determining that the first retention data does not match the predetermined criteria, identify the first retention data as non-standard; and
- responsive to determining that the first retention data does match the predetermined criteria, identify the first retention data as standard.

17. The apparatus of claim 13, wherein the computer-readable instructions, when executed, further cause the apparatus to:
- receive user selection of a portion of the displayed first retention data and second retention data; and
- responsive to receiving the user selection, display a retention information window including at least one of: system identifier, predefined retention period, backup retention period, and amount of storage capacity used.

* * * * *